(12) United States Patent
Johnston

(10) Patent No.: US 7,810,487 B2
(45) Date of Patent: Oct. 12, 2010

(54) APPARATUS AND METHODS FOR PROVIDING AN IMPROVED COOKING GRATE FOR AN OUTDOOR COOKING GRILL

(75) Inventor: Robert Johnston, Columbus, GA (US)

(73) Assignee: W.C. Bradley Company, Columbus, GA (US)

( * ) Notice: Subject to any disclaimer, the term of this patent is extended or adjusted under 35 U.S.C. 154(b) by 1257 days.

(21) Appl. No.: 11/291,611

(22) Filed: Dec. 1, 2005

(65) Prior Publication Data

US 2007/0125357 A1 Jun. 7, 2007

(51) Int. Cl.
*F23H 17/12* (2006.01)

(52) U.S. Cl. ............... 126/168; 126/152 R; 126/152 A; 126/152 B; 126/176 A; 126/180; 126/541

(58) Field of Classification Search ............. 126/152 A, 126/152 B, 152 R, 168, 176 A, 541, 180
See application file for complete search history.

(56) References Cited

U.S. PATENT DOCUMENTS

| | | | | |
|---|---|---|---|---|
| 182,999 A | * | 10/1876 | Gwynn | 126/168 |
| 333,687 A | * | 1/1886 | Slot, Sr. et al. | 126/168 |
| 1,912,868 A | * | 6/1933 | Thompson | 126/152 B |
| 1,912,869 A | * | 6/1933 | Thompson | 126/152 B |
| 1,938,362 A | * | 12/1933 | Watson | 126/152 B |
| 1,959,117 A | * | 5/1934 | Thompson | 126/180 |
| 2,174,338 A | * | 9/1939 | Warner | 266/279 |
| 2,687,081 A | * | 8/1954 | Tucker | 249/125 |
| 2,926,657 A | * | 3/1960 | Ford | 126/512 |
| 2,940,381 A | * | 6/1960 | Cottongim et al. | 99/445 |
| 2,965,097 A | * | 12/1960 | Clark, Jr. | 126/30 |
| 2,985,097 A | * | 5/1961 | Nevin et al. | 99/447 |
| 3,191,592 A | * | 6/1965 | Lorbacher | 126/25 A |
| 3,410,540 A | * | 11/1968 | Bruckert | 261/113 |
| 3,463,325 A | * | 8/1969 | Rogers et al. | 211/191 |
| 3,946,651 A | | 3/1976 | Garcia | |
| 4,078,664 A | * | 3/1978 | McConnell | 211/189 |
| 4,149,516 A | * | 4/1979 | Hall | 126/41 R |
| 4,159,291 A | * | 6/1979 | Bruckert et al. | 261/114.1 |
| 4,161,168 A | * | 7/1979 | Cagle | 126/524 |
| 4,403,597 A | | 9/1983 | Miller | |
| 4,418,863 A | * | 12/1983 | Kimbrell, Sr. | 229/169 |
| 4,541,992 A | * | 9/1985 | Jerge et al. | 422/300 |
| 4,703,746 A | | 11/1987 | Hitch | |
| 4,930,491 A | * | 6/1990 | Purello | 126/332 |
| 4,955,490 A | * | 9/1990 | Schafer | 211/187 |
| 4,979,440 A | * | 12/1990 | Latour et al. | 99/445 |
| 5,105,725 A | * | 4/1992 | Haglund | 99/446 |

(Continued)

*Primary Examiner*—Kenneth B Rinehart
*Assistant Examiner*—Jorge Pereiro
(74) *Attorney, Agent, or Firm*—Thomas, Kayden, Horstemeyer, & Risley, LLP

(57) ABSTRACT

Provided is a cooking grate for improving cooking performance on an outdoor cooking grill. The cooking grate has a metallic plate, configured to be placed over a heat source in the outdoor cooking grill, where the metallic plate has a plurality of perforation holes. The cooking grate further includes a plurality of cooking surface ribs, configured to support food during cooking and positioned above the metallic plate. Also provided are methods of providing an improved cooking grate for an outdoor cooking grill including the steps of: perforating a metallic plate, configured to be positioned above a heat source on the outdoor cooking grill; forming a plurality of cooking surface ribs, configured to receive food to be cooked thereon.

13 Claims, 11 Drawing Sheets

U.S. PATENT DOCUMENTS

| | | | |
|---|---|---|---|
| 5,172,628 A * | 12/1992 | Pillsbury et al. | 99/421 H |
| D340,835 S * | 11/1993 | Lupa et al. | D7/409 |
| D341,292 S * | 11/1993 | Johnston | D7/409 |
| 5,277,106 A | 1/1994 | Raymer et al. | |
| 5,347,978 A * | 9/1994 | Zuran | 126/41 R |
| 5,355,780 A | 10/1994 | Campbell | |
| 5,355,868 A | 10/1994 | Haen | |
| 5,453,574 A * | 9/1995 | Zuran et al. | 126/41 R |
| 5,467,691 A | 11/1995 | Koziol | |
| D364,995 S * | 12/1995 | Koziol | D7/409 |
| 5,628,415 A * | 5/1997 | Mulholland | 211/189 |
| 5,735,260 A | 4/1998 | Rimback | |
| 5,911,812 A | 6/1999 | Stanek et al. | |
| 5,974,954 A | 11/1999 | Rigney et al. | |
| 6,087,634 A * | 7/2000 | Cook et al. | 219/396 |
| 6,105,798 A * | 8/2000 | Gruber et al. | 211/151 |
| 6,114,666 A | 9/2000 | Best | |
| 6,186,931 B1 * | 2/2001 | Calvert et al. | 493/8 |
| 6,314,870 B1 | 11/2001 | Staller et al. | |
| 6,481,343 B1 * | 11/2002 | Rigney et al. | 99/396 |
| 6,520,174 B1 | 2/2003 | Scigliuolo | |
| 7,066,169 B2 | 6/2006 | Feldewerth et al. | |
| 2006/0003279 A1 | 1/2006 | Best | |
| 2006/0021517 A1 | 2/2006 | Best | |
| 2008/0072890 A1 | 3/2008 | Best | |
| 2008/0121117 A1 | 5/2008 | Best | |
| 2009/0202688 A1 | 8/2009 | Best | |

* cited by examiner

APPARATUS AND METHODS FOR PROVIDING AN IMPROVED COOKING GRATE FOR AN OUTDOOR COOKING GRILL

TECHNICAL FIELD

The present disclosure is generally related to outdoor cooking grills and, more particularly, is related to an apparatus and method for providing an improved cooking grate for an outdoor cooking grill.

BACKGROUND

Outdoor cooking grills are popular for many reasons including enhanced food flavor and enjoyment of the outdoor cooking process. Gas-fired cooking grills are popular for home use and differ from traditional barbecue grills in that they rely upon a gas flame for heat energy, as opposed to the combustion of charcoal briquettes or the like. Conventional burner gas grills frequently utilize tubular burners having multiple combustion ports or orifices. The grills often employ an inert material, such as so-called "lava rocks" or ceramic tiles, to absorb drippings from food cooking on a grate positioned above the material and to radiate heat for providing a more even heat distribution. Infrared burner gas grills provide a generally planar heat source where the combustion occurs at or near the surface of a ceramic or fiber element. The planar configuration of infrared burners reduces or eliminates the need for the inert material with respect to heat distribution.

A disadvantage with such grills is that food drippings, such as liquefied greases and oils, that come into contact with gas flames or other heat sources during cooking cause flash flames or "flare-ups," which can result in the charring of the food product being grilled. Although vaporization of the food drippings is desirable because the vapors enhance the flavor of food cooked on a grill, the flare-ups frequently associated with the food drippings can be detrimental to the resulting quality of grilled food. One attempted solution to the problem of flare-ups includes U.S. Pat. No. 5,355,780 to Campbell, which discloses a grate for a cooking grill that utilizes the spacing between the rails to prevent flames from passing through the spaces. Another device, disclosed in U.S. Pat. No. 5,735,260, utilizes one or more tiles positioned between the heat source and the cooking surface. The tiles include channels for allowing food drippings to flow through to the heat source. Similarly, U.S. Pat. No. 6,114,666 utilizes a ceramic infrared radiant energy emitter that is positioned above the heat source. The emitter re-radiates thermal energy that is absorbed from the burner below. Other devices, such as disclosed in U.S. Pat. No. 5,911,812, utilize fluid channels to direct the food drippings away from the hottest section of the cooking grill. Still other devices, such as disclosed in U.S. Pat. No. 6,314,870 utilize various forms of drip pans placed between the item being cooked and the heat source. In some cases, the above described devices require additional grill structural features for proper implementation. For example, the tiles of the '260 patent and the emitter of the '666 patent require a support structure between the heat source and the cooking grate. Similarly, other of the devices reduce the flavor of the cooked food by completely eliminating or reducing the favorable impact of the food drippings. Thus, a heretofore unaddressed need exists in the industry to address the aforementioned deficiencies and inadequacies.

SUMMARY

Briefly described, one embodiment, among others, can be implemented as a cooking grate for improving cooking performance on an outdoor cooking grill, comprising: a metallic plate configured to be placed over a heat source in the outdoor cooking grill, the metallic plate having a plurality of perforation holes; and a plurality of cooking surface ribs configured to support food during cooking and positioned above the metallic plate.

Embodiments of the present disclosure can also be viewed as providing methods of providing an improved cooking grate for an outdoor cooking grill comprising: perforating a metallic plate, configured to be positioned above a heat source on the outdoor cooking grill; forming a plurality of cooking surface ribs, configured to be received by the plurality of cooking rib supports and positioned above the metallic plate; and assembling a cooking grate by attaching the plurality of cooking rib supports to the metallic plate utilizing the plurality of cooking rib supports.

Embodiments of the present disclosure can also be viewed as providing an apparatus for improving cooking performance on an outdoor cooking grill, comprising: a grate bar assembly, configured to support food on the outdoor grill; a grate housing, configured to receive the grate bar assembly; a first end cap, attached to the grate housing; and a second end cap, attached to the grate housing.

Embodiments of the present disclosure can also be viewed as providing a cooking grill, comprising: a housing having a cavity; a heat source mounted within the cavity of the housing; and a cooking surface, supported in the housing at a position above the heat source. The cooking surface comprises a perforated plate and a plurality of cooking surface ribs positioned above the perforated plate.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
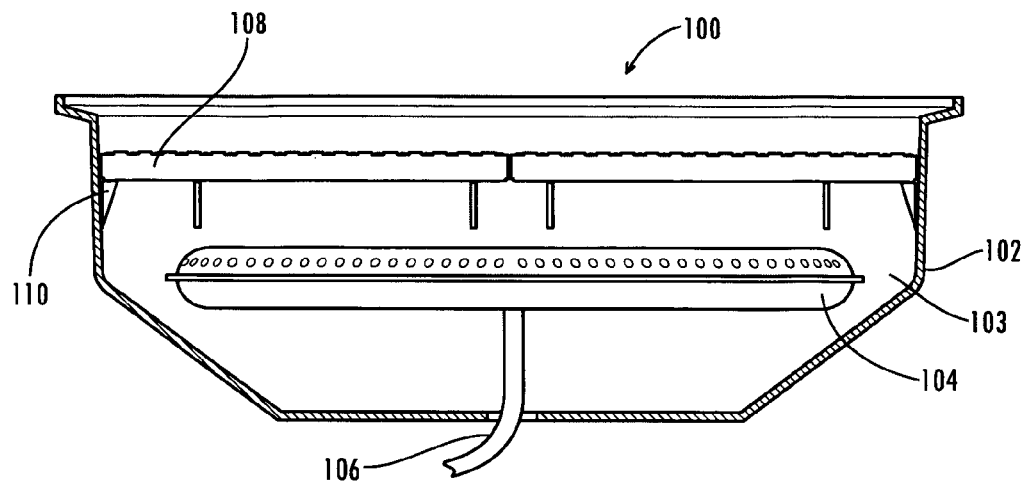
FIG. 1 is a side view illustrating an outdoor cooking grill as utilized in an embodiment of the disclosure herein.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Reference is now made to FIG. 1, which is a side view illustrating an outdoor cooking grill as utilized in an embodiment as disclosed herein. The outdoor cooking grill 100 includes a grill housing 102 having a cavity 103. Located inside the cavity 103 is a heat source 104, which is attached to a fuel supply line 106. The heat source 104 of this embodiment is a gas fired burner fueled by natural gas or propane gas. The heat source 104 can be constructed as a hollow heat resistant structure having multiple combustion ports. Alternatively, the heat source 104 can be an infrared burner utilizing a ceramic and/or fiber material configured in a generally planar geometry, where combustion occurs on or near the planar surface.

The cooking grill 100 includes a cooking grate 108 positioned above the heat source 104 and supported within the cavity 103 by cooking grate supports 110. One of ordinary skill in the art will appreciate that the cooking grate supports 110 can be configured as separately attached members or integrally formed into the grill housing 102. Further, the grill supports 110 can be configured as multiple distinct points of support around the periphery of the grill housing 102 or as a supporting surface, such as a lip or ledge, integrally formed in the grill housing 102.

Figure 2:
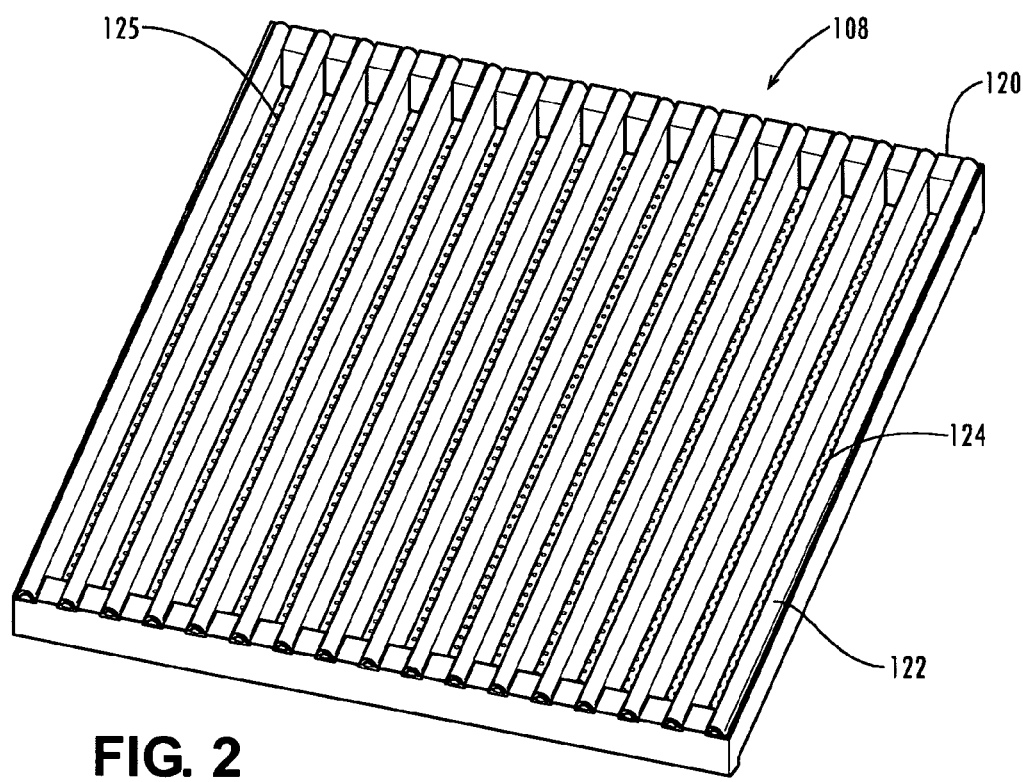
FIG. 2 is a perspective view illustrating an embodiment of a cooking grate as disclosed herein.

Reference is now made to FIG. 2, which is a perspective view illustrating an embodiment of a cooking grate as disclosed herein. The cooking grate 108 includes a metallic plate 124 having perforation holes 125. The cooking grate 108 also includes cooking surface ribs 122 for supporting food during cooking. The cooking surface ribs 122 are supported by rib mounts 120. The rib mounts 120 are attached to the metallic plate 124 and provide support for the cooking surface ribs 122 relative to the metallic plate 124.

Figure 3:
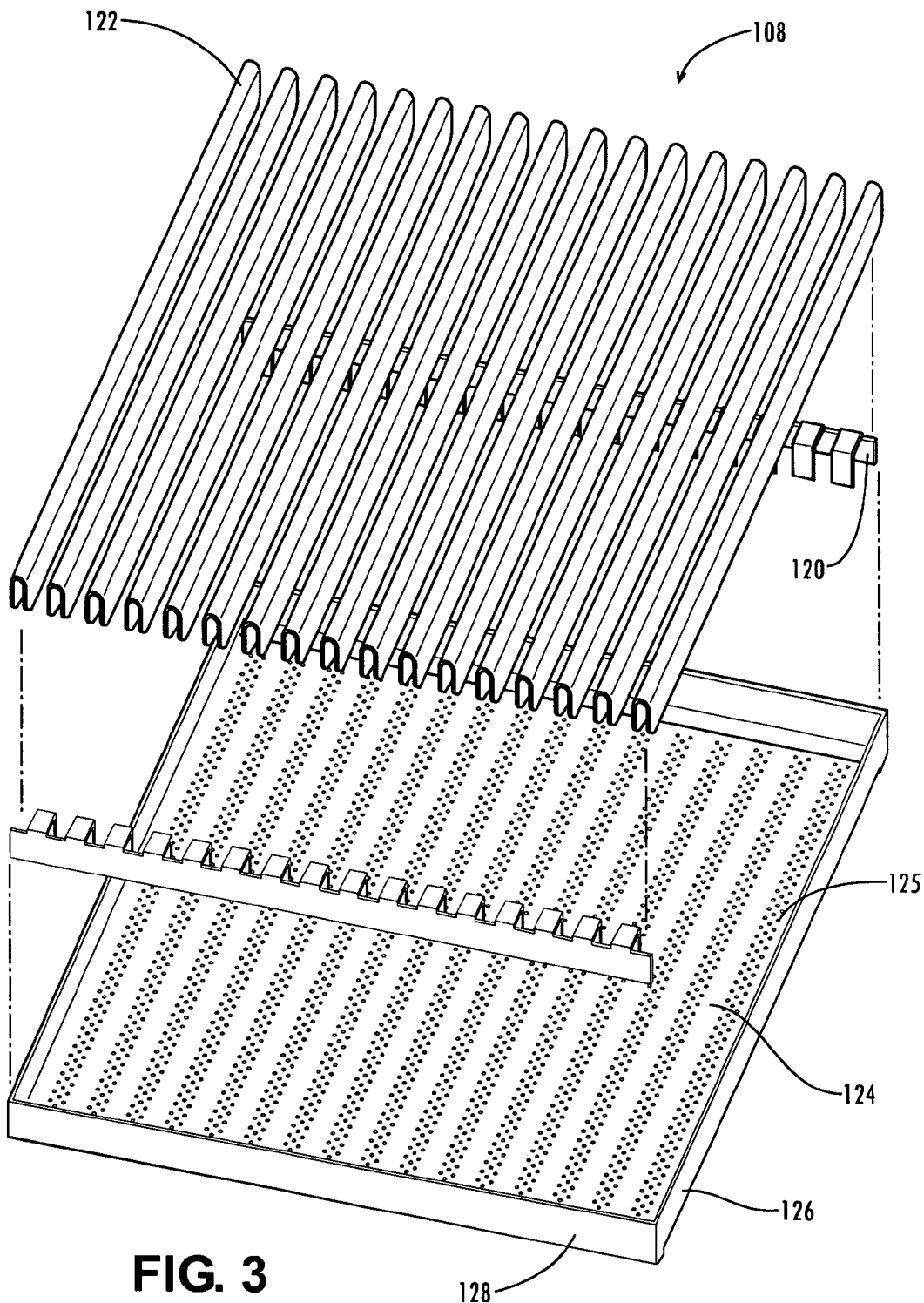
FIG. 3 is an exploded perspective view illustrating an embodiment of a cooking grate as disclosed herein.

Reference is now made to FIG. 3, which shows an exploded view of the cooking grate of FIG. 2 and better illustrates relational configuration between the rib mounts 120, the cooking surface ribs 122, and the metallic plate 124. The cooking grate 108 can also be configured to include end walls 126 and side walls 128. The end and side walls 126, 128 can be formed from the same material as the metallic plate 124 or, in the alternative, can be constructed separately and attached to the metallic plate 124 using any number of mechanical fastening techniques including, but not limited to, bonding, welding, or fastening with mechanical fasteners such as rivets, screws, bolts, clips, and clamps among others. The rib mounts 120 are formed of a heat resistant material and can optionally be attached to the metallic plate 124 or can be configured to maintain their position based on the interference fit of the cooking surface ribs 122. Each of the cooking surface ribs 122 is constructed of an elongated heat resistant sheet or plate material that is formed to have a generally U-shaped profile. One of ordinary skill in the art knows or will know that the cooking surface ribs 122 can be constructed of different materials using different techniques within the scope and spirit of this disclosure. For example, the cooking surface ribs 122 can be elongated sheet formed into a profile other than U-shaped or can be constructed out of a solid elongated heat resistant material including, but not limited to, metallic or ceramic bar, rod, or wire.

The metallic plate 124 also includes multiple perforation holes 125. During cooking, the perforation holes 125 are configured to allow a portion of the liquid drippings from the food to drop to the heat source. As the drippings are vaporized by the heat source, the flavor of the food is enhanced by the resulting vapors. Additionally, the remaining portion of the drippings are vaporized by the elevated temperature of the metallic plate 124. Further, the configuration of the perforations reduces the flow of air from the cavity 103 and thus to the spaces between the ribs 122, which reduces or eliminates requisite combustion air for grill flare-ups.

Alternative embodiments of the cooking grate can be configured without the rib mounts 120. For example, the cooking surface ribs 122 can be directly attached to the metallic plate 124 through any of the mechanical fastening techniques discussed above. Alternatively, the cooking surface ribs 122 may be supported by a structural component in the grill housing (not shown). An exemplary structural component for supporting the cooking surface ribs 122 can include a ledge or lip feature attached to or integrated into the grill housing, among others. Similarly, although the cooking surface ribs are illustrated as substantially parallel, other cooking surface rib arrangements are consistent within the scope and spirit of this disclosure.

Figure 4:
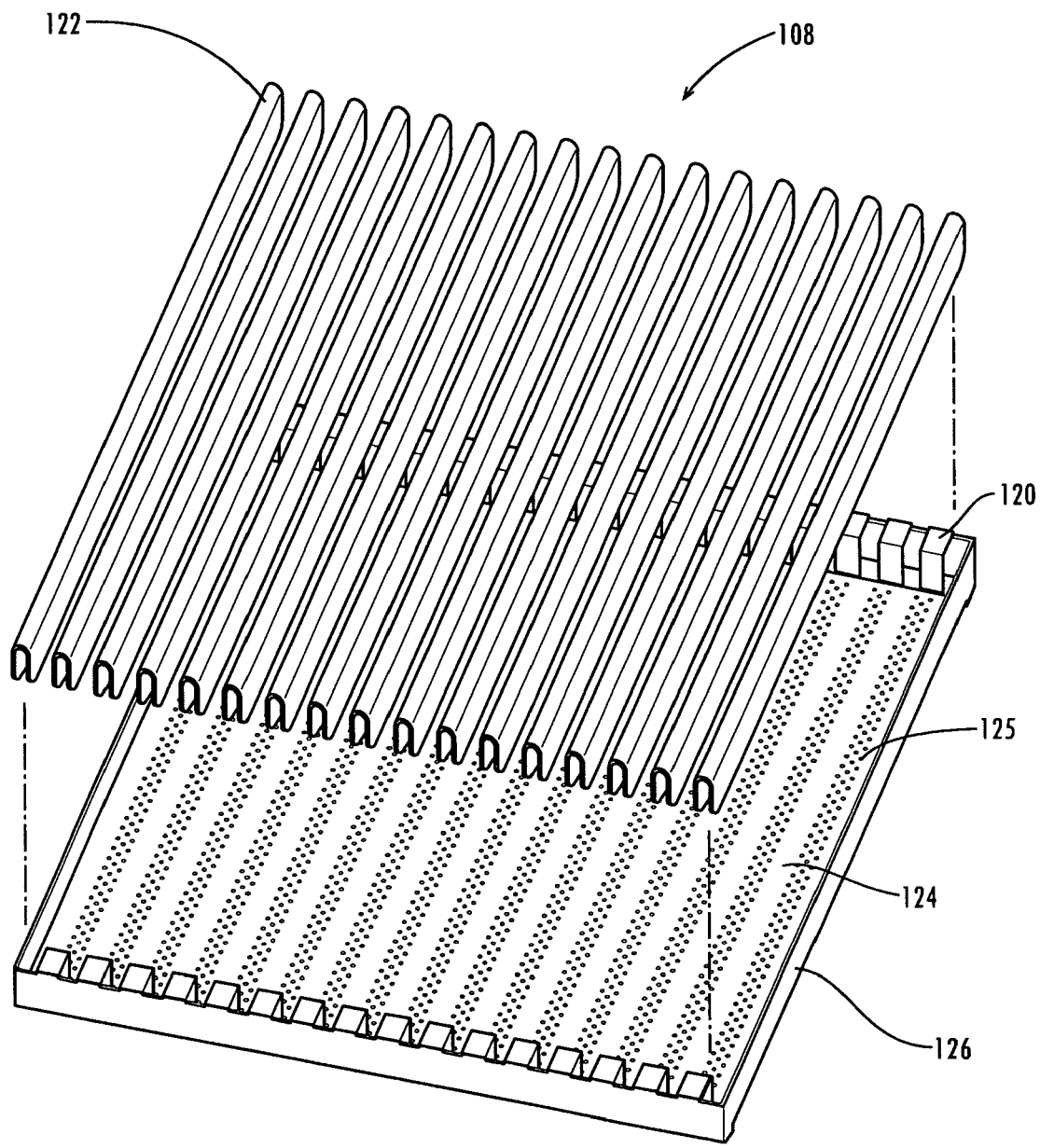
FIG. 4 is an exploded perspective view illustrating an alternative embodiment of a cooking grate as disclosed herein.

Brief reference is now made to FIG. 4, which is an exploded view illustrating an alternative embodiment of a cooking grate as disclosed herein. The cooking grate 108 includes a metallic plate 124, the rib mounts 120, and the plate side walls 126 as formed from a single sheet. The perforation holes 125 are configured in rows such that the rows coincide with areas of the metallic plate not covered by the cooking surface ribs 122. In some embodiments, integrally formed rib mounts 120 serve a similar structural function as the plate end walls. Although the figures generally depict two rib mounts 120, one of ordinary skill in the art will appreciate that a single centrally located rib mount may be utilized within the scope and spirit of this disclosure. Also contemplated within the scope and spirit of this disclosure is a configuration that justifies more than two rib mounts 120.

Figure 5:
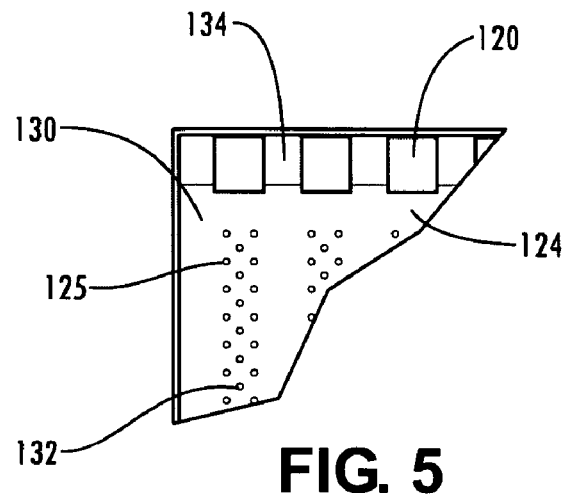
FIG. 5 is a partial top view illustrating an embodiment of a cooking grate having exposed and covered sections.

Reference is now made to FIG. 5, which is a partial top view illustrating an embodiment of a cooking grate having exposed and covered sections. The partial view of the cooking grate includes the metallic plate 124 and the rib mounts 120. The perforation holes 125 are arranged in rows between similarly placed sections of non-perforated plate. Additionally, the rib mount 120 includes multiple notches 134 to receive the cooking surface ribs, such that when the cooking surface ribs 122 are in place, there are covered sections 130 and exposed sections 132. Although in some embodiments the perforation holes 125 are generally located in the exposed sections, one of ordinary skill in the art will appreciate that the perforation holes 125 could also be arranged in the covered sections 130 within the scope and spirit of this disclosure.

Figure 6:
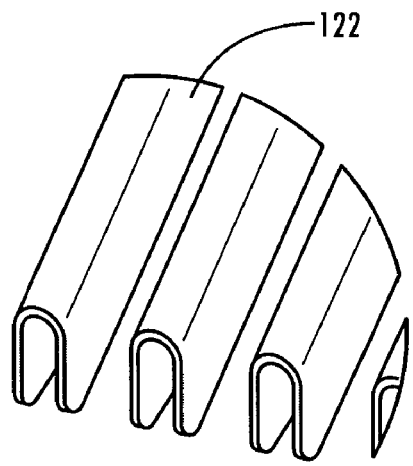
FIG. 6 is a partial perspective view illustrating an embodiment of cooking surface ribs as disclosed herein.
Figure 7:
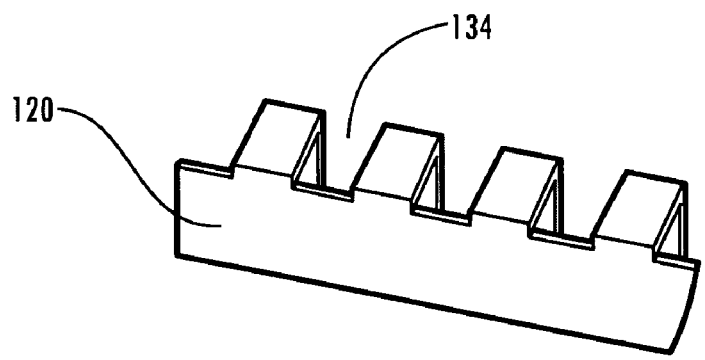
FIG. 7 is a partial perspective view illustrating an embodiment of a rib mount as disclosed herein.

Brief reference is now made to FIG. 6, which is a partial perspective view illustrating an embodiment of cooking surface ribs as disclosed herein. The cooking surface ribs 122 can be formed of an elongated heat resistant material including, but not limited to, metal or ceramic. Although the cooking surface ribs 122 are illustrated as being generally U-shaped, one of ordinary skill in the art knows or will know that other geometries are contemplated within the scope and spirit of this disclosure. For example, other possible geometries include, but are not limited to, V-shaped, C-shaped, W-shaped, O-shaped, D-shaped, triangular, and rectangular among others. The rib mounts 120, as illustrated in the partial view of FIG. 7, are configured with notches 134 to receive and support the cooking surface ribs 122. The rib mounts 120 can be formed by stamping and breaking or bending a sheet or plate of heat resistant material such as metal.

Figure 8:
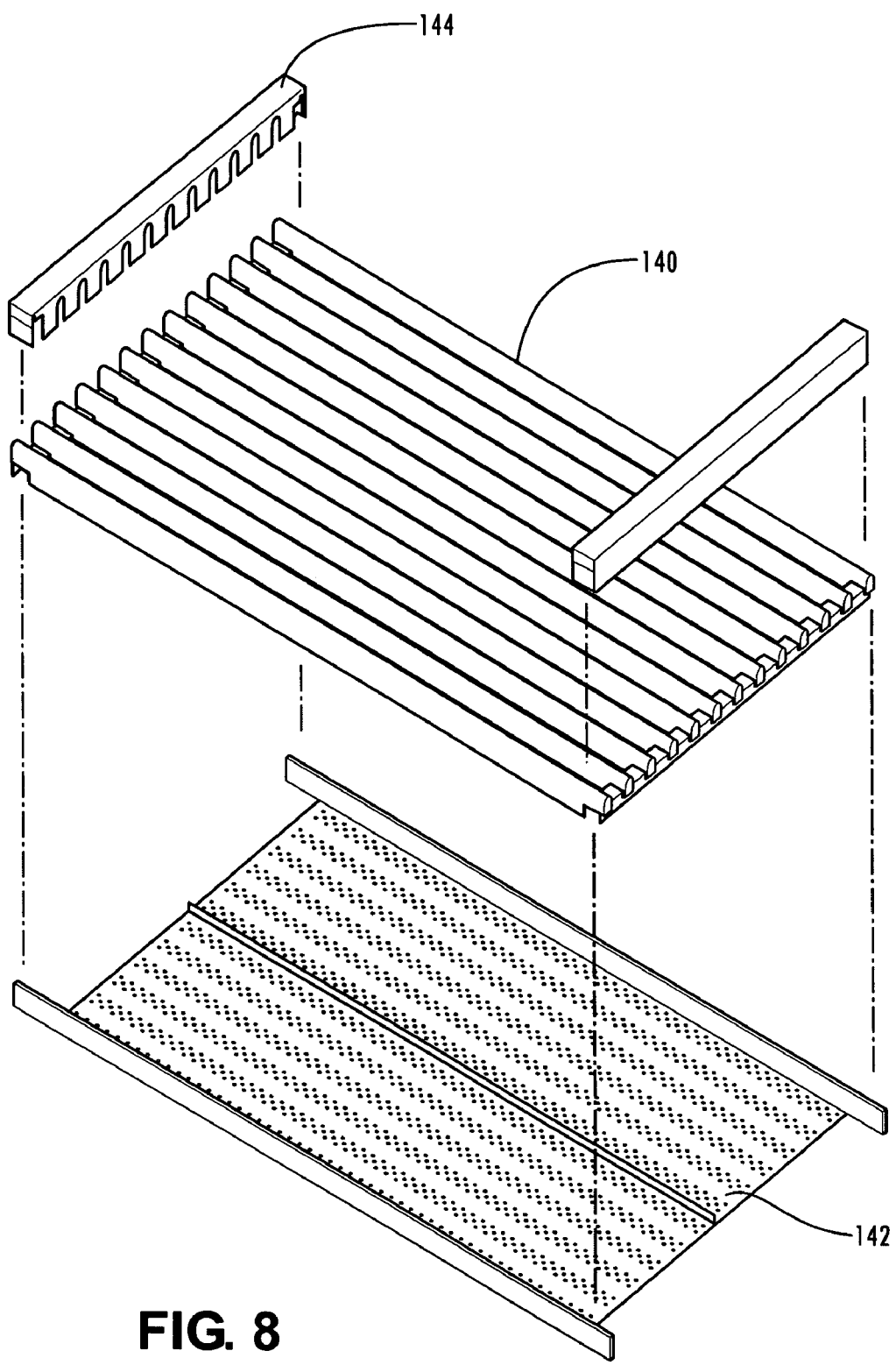
FIG. 8 is an exploded perspective view illustrating an alternative embodiment of a cooking grate as disclosed herein.
Figure 9:
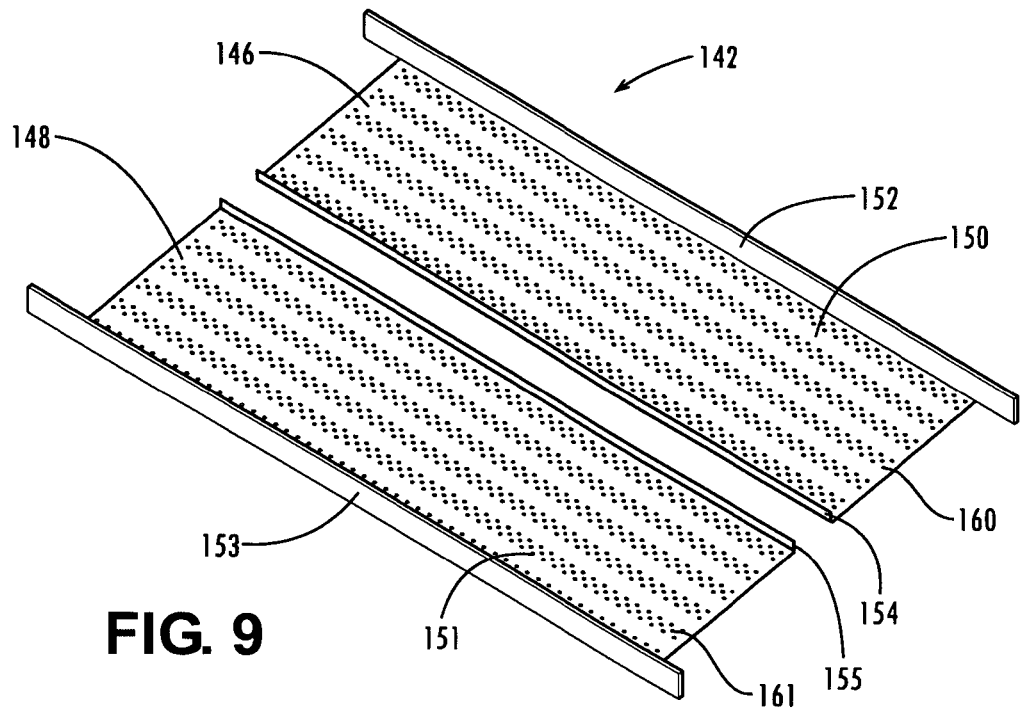
FIG. 9 is an exploded perspective view of an embodiment of a grate housing as disclosed herein.

Reference is now made to FIG. 8, which is an exploded perspective view illustrating an alternative embodiment of a cooking grate as disclosed herein. The cooking grate includes a grate bar assembly 140, a grate housing 142 configured to receive the grate bar assembly, and end caps 144, which are attached to the grate housing over the grate bar assembly 140. As illustrated in FIG. 9, which is an exploded perspective view of the grate housing of FIG. 8, the grate housing 142 includes first and second housing components 146, 148. The housing components 146, 148 each include a substantially planar surface 150, 151 having multiple perforation holes 160, 161. End walls 152, 153 are formed along one edge of each of the substantially planar surfaces 150, 151 and mating surfaces 154, 155 are formed along another edge of the substantially planar surfaces 150, 151. The first and second housing components 146, 148 are constructed such that the grate housing 142 is formed by bonding the mating surface 154 of the first housing component 146 to the mating surface 155 of the second housing component 148.

Figure 10:
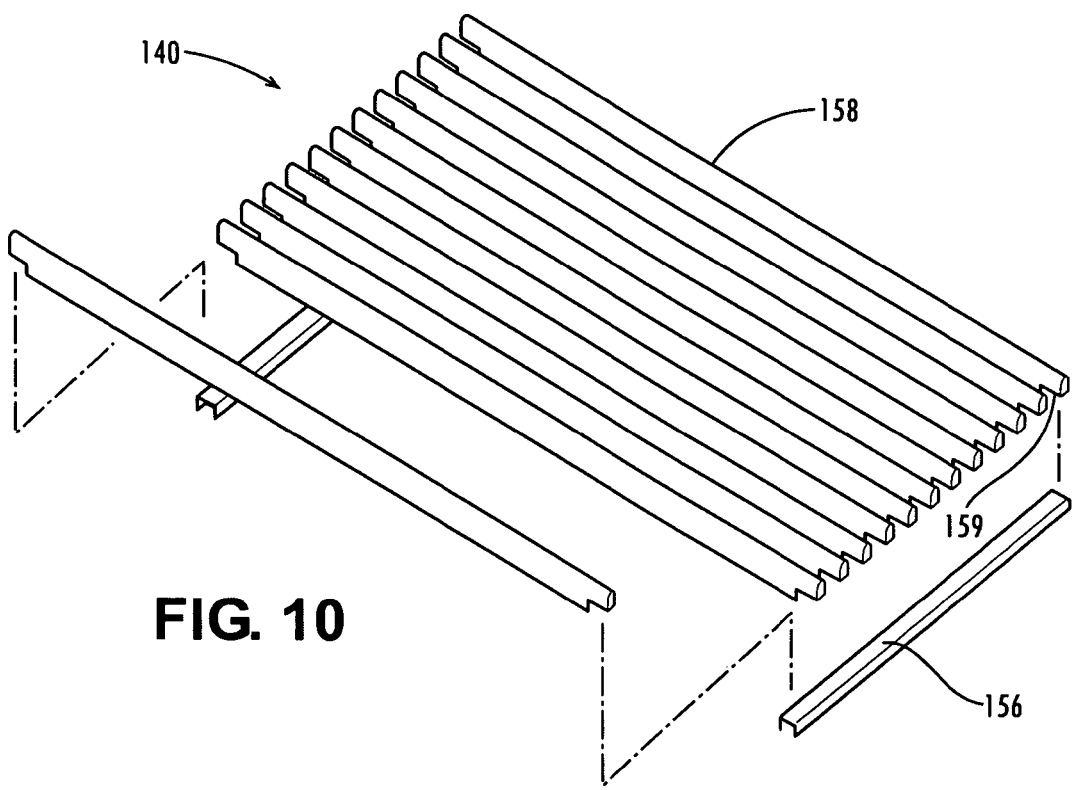
FIG. 10 is an exploded perspective view of an embodiment of a grate bar assembly as disclosed herein.

Reference is now made to FIG. 10, which is an exploded perspective view of an embodiment of a grate bar assembly. The grate bar assembly 140 includes multiple grate bars 158 arranged in a parallel configuration and attached to support brackets 156. The support brackets 156 are constructed of elongated heat resistant material and may be formed in a variety of profiles to increase structural rigidity including U-shaped, S-shaped, rectangular, triangular, and circular among others. The support brackets 156 are arranged substantially perpendicular to the multiple grate bars 158. The grate bars 158 of this embodiment feature relief sections 159 for receiving the support brackets 156. One of ordinary skill in the art will appreciate that alternative embodiments can utilize a single support bracket 156 located in a substantially central position or more than two support brackets 156 within the scope and spirit of this disclosure.

Figure 11:
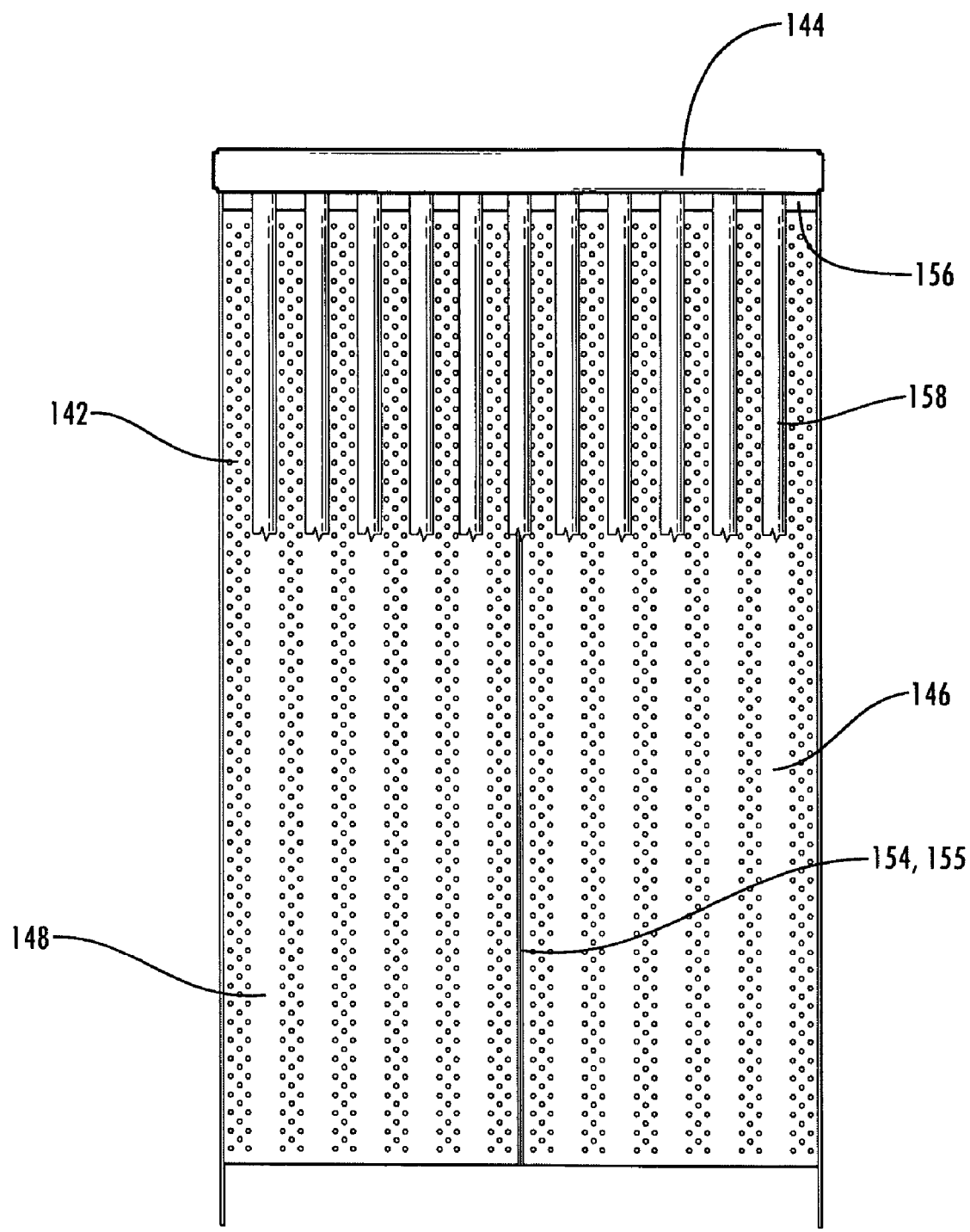
FIG. 11 is a partial top cut-away view of an embodiment of a cooking grate as disclosed herein.

Reference is now made to FIG. 11, which is a partial top cut-away view of an embodiment of a cooking grate. The cooking grate includes a grate housing consisting of a first housing component 146 attached to a second housing component 148 at their respective mating surfaces 154, 155. The mating surfaces can be attached using a variety of techniques including, but not limited to, mechanical fasteners, welding, and bonding among others. The mechanical fasteners can include, but are not limited to, screws, rivets, bolts, retaining clips, and resilient elements among others. The top section of the cut-away view illustrates grate bars 158 attached to the grate housing 142 and an end cap 144 installed over the grate bars 158. Note that although the grate bars 158 are illustrated as covering non-perforated sections of the grate housing 142 and the joined mating surfaces 154, 155 of the first and second housing components 146, 148, one of ordinary skill in the art will appreciate that this feature is not intended to limit the scope or spirit of this disclosure.

Figure 12:
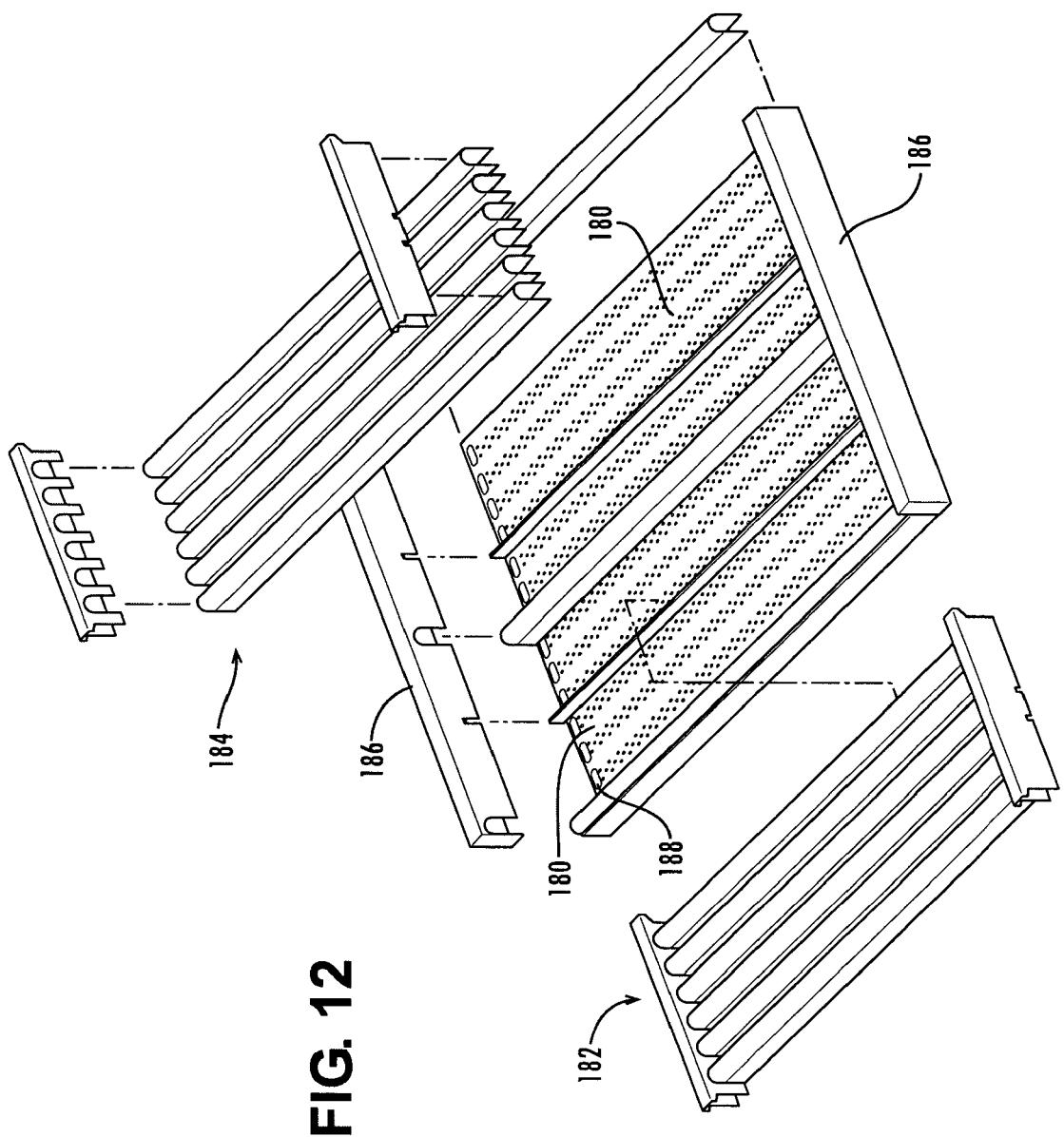
FIG. 12 is an exploded perspective view illustrating an alternative embodiment of a cooking grate as disclosed herein.

Reference is now made to FIG. 12, which is an exploded perspective view illustrating an alternative embodiment of a cooking grate as disclosed herein. The cooking grate includes two grate bar assemblies 182, 184, a grate housing 180 configured to receive the grate bar assemblies 182, 184, and end caps 186. Similar to an embodiment as illustrated in FIG. 8, the grate housing 180 can include multiple housing components, each having a substantially planar surface and multiple perforation holes. One benefit of utilizing multiple housing components is increased structural integrity that can prove to be beneficial in a thermally diverse environment. The housing components can further include cleanout holes 188 located near the edges for scraping debris on the grate housing into the grill housing below. The grate bar assemblies 182, 184 can generally be constructed consistent with the grate bar assembly described above regarding FIG. 10. In use and operation, the grate bar assemblies 182, 184 can be lifted off of the grate housing 180 for ease of cleaning.

Figure 13:
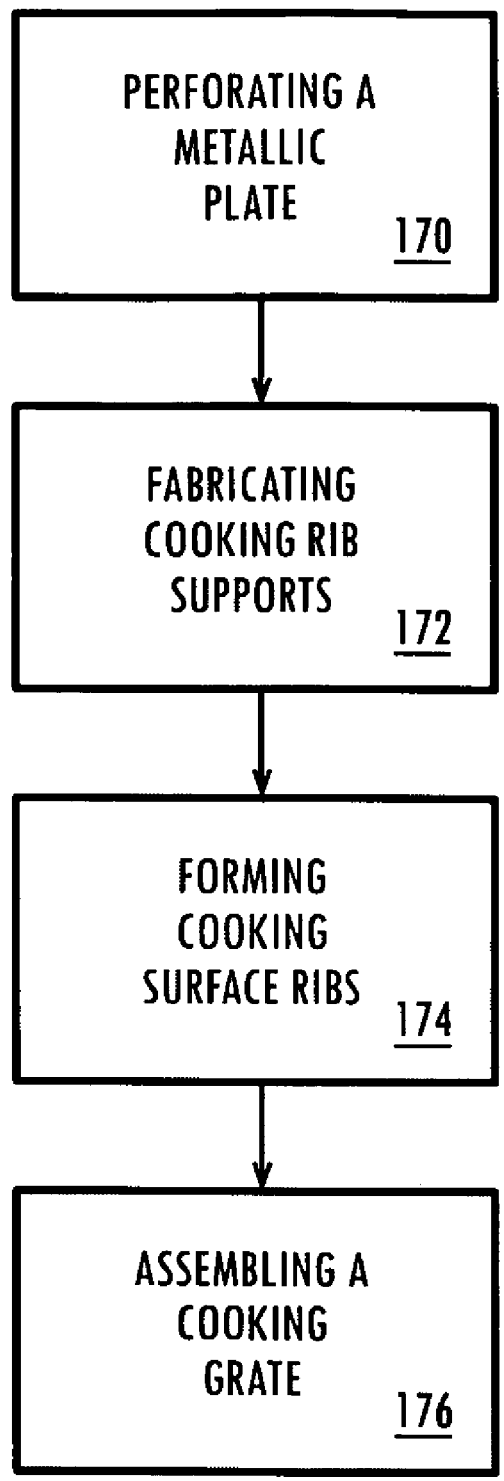
FIG. 13 is a block diagram illustrating an embodiment of an exemplary method as disclosed herein.

Reference is now made to FIG. 13, which is a block diagram illustrating an embodiment of a method as disclosed herein. The method includes perforating a metallic plate in block 170. The metallic plate provides a structure that collects a portion of food drippings during the cooking process such that the elevated temperatures of the metallic plate vaporize the food drippings thereby enhancing the flavor of the food. The perforations in the metallic plate permit a portion of the food drippings to transfer to the heat source below for further vaporization. The perforations do not, however, allow the requisite air for unwanted combustion to flow from the grill cavity to the areas between the ribs. The absence of additional combustion air reduces or prevents the occurrence of excessive flare-ups fueled from the drippings by reducing the requisite oxygen for the flare-up combustion process.

In optional block 172, cooking rib supports are fabricated to provide support and alignment of the cooking surface ribs, which are formed in block 174. The cooking rib supports are generally elongated and configured to receive the generally elongated cooking surface ribs in a substantially perpendicular arrangement. The cooking grate is assembled in block 176 by attaching the cooking rib supports to the metallic plate at, for example, opposite edges and then attaching the cooking surface ribs to the cooking rib supports such that the cooking surface ribs are arranged to create a substantially planar cooking surface above the metallic plate. Alternatively, in the absence of cooking rib supports, the cooking surface ribs can be supported by a structural feature, such as a ledge or a lip, either attached to or integrated into the grill housing (not shown). In some embodiments, the cooking surface ribs can also be directly attached or mounted to the perforated plate.

Figure 14:
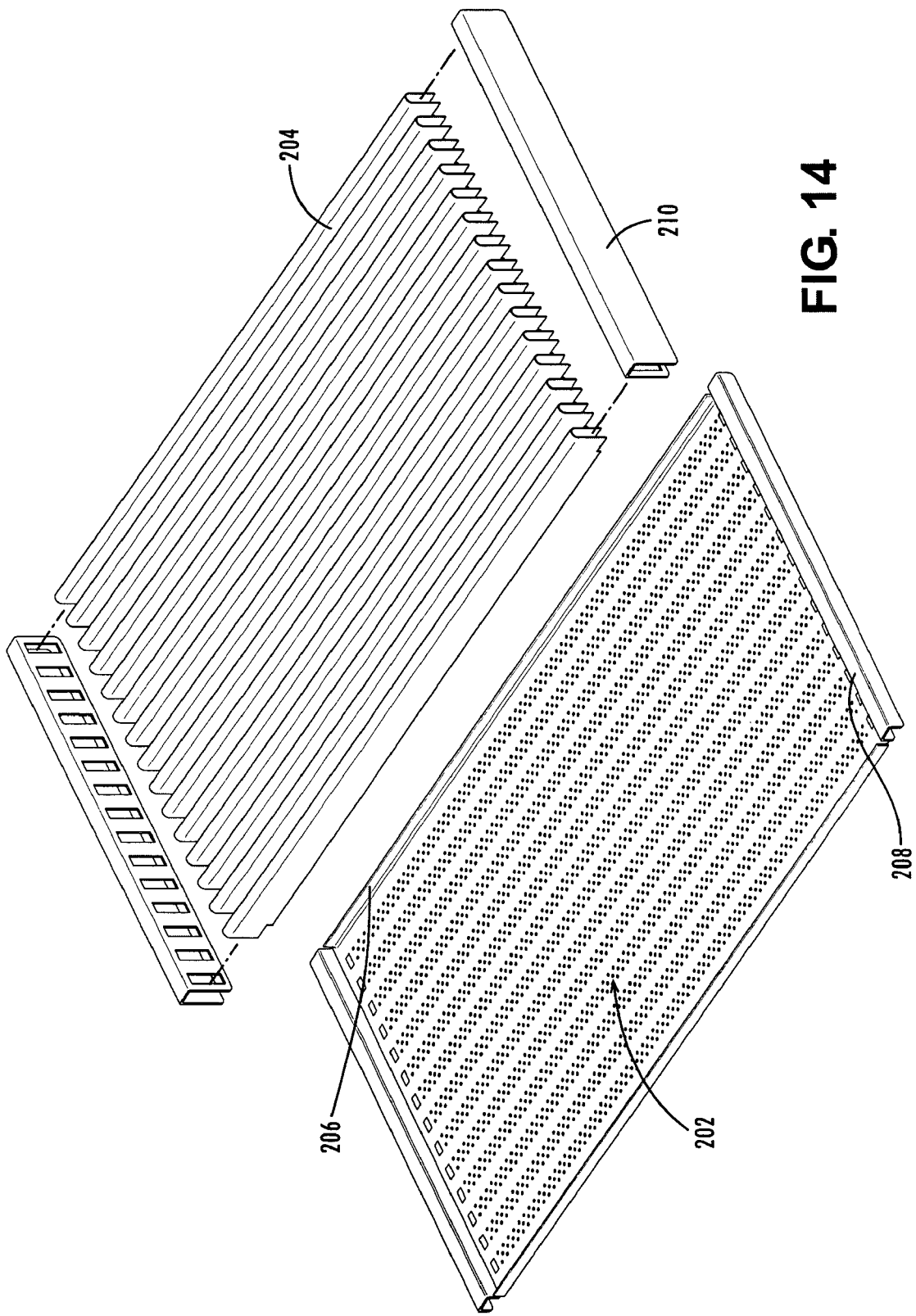
FIG. 14 is an exploded perspective view illustrating another alternative embodiment of a cooking grate as disclosed herein.

Reference is made to FIG. 14, which is an exploded perspective view of another alternative embodiment of a cooking grate. The cooking grate includes a grate housing 202 that includes side walls 206 formed at opposing edges of the of the grate housing 202 and inverted, generally U-shaped channels 208 formed at other opposing edges of the grate housing 202. The U-shaped channels 208 are configured to receive rib mounts 210, which are configured to receive cooking ribs 204. Additionally, the U-shaped channels, in combination with the side walls 206, provide increased structural integrity. While the cooking grate 200 is illustrated as a single unit, it is contemplated within the scope and spirit of this disclosure that more than one cooking grate 200 of this configuration can be utilized in combination to create a larger cooking surface. Further, multiple cooking grates can be permanently or removeably secured to one another in some embodiments.

Figure 15:
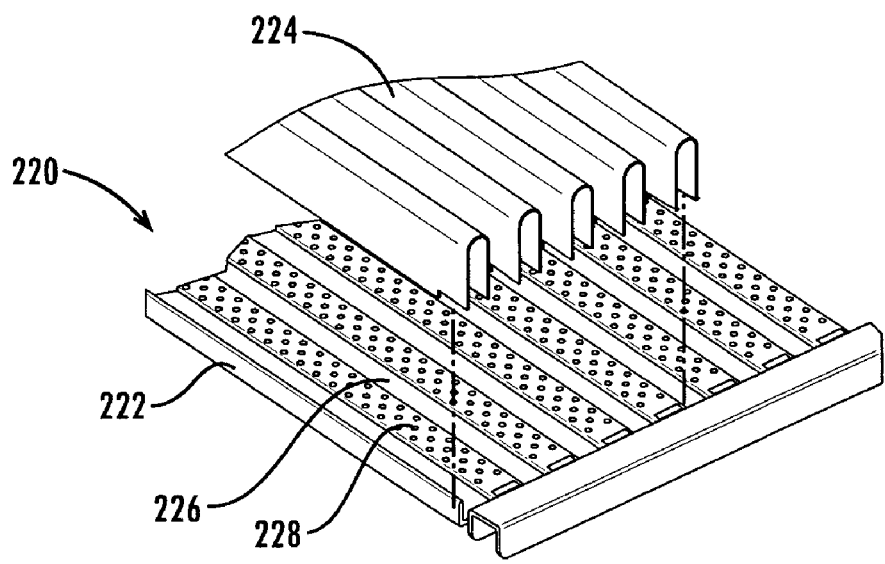
FIG. 15 is a partial exploded perspective view illustrating another alternative embodiment of a cooking grate as disclosed herein.

Reference is now made to FIG. 15, which is a partial exploded perspective view illustrating another alternative embodiment of a cooking grate as disclosed herein. The cooking grate includes a plurality of cooking ribs 224 configured to be supported by a grate housing 220. Some embodiments provide that the cooking ribs 224 can be removably or non-removably attached or secured to the grate housing 220. The cooking ribs can be further connected in groups such that multiple cooking ribs can be installed and removed at the same time. The grate housing 220 can be formed of a single piece of planar heat resistant material including but not limited to metallic plate, among others. The grate housing 220 can include one or more side walls 222 configured to receive the outermost cooking rib and to provide additional structural integrity to the grate housing 220. Further, the grate housing 220 can include channels 226 formed into the top surface and configured to receive the cooking ribs 224 or the housing can be substantially flat. The grate housing also includes perforated sections 228 that are arranged on the raised area between the channels 226, when designed in this configuration. The perforated sections include perforation holes configured to permit drippings from food to pass through the cooking grate in limited quantities. The channels 226 alternate with perforated sections 228 that are arranged between the cooking ribs 224 when installed into the grate housing 220. The unitary nature of cooking grates in these embodiments provides a design capable of being manufactured in a cost effective manner.

Figure 16A:
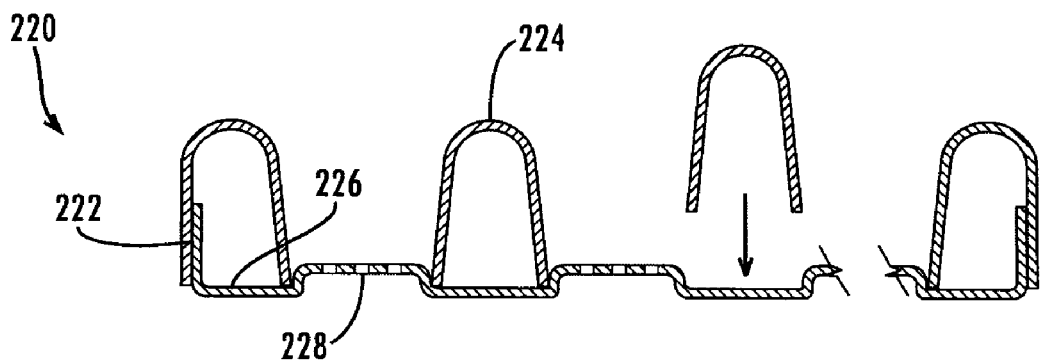
FIGS. 16A and 16B are side views of alternative embodiments of a cooking grate as disclosed herein.
Figure 16B:
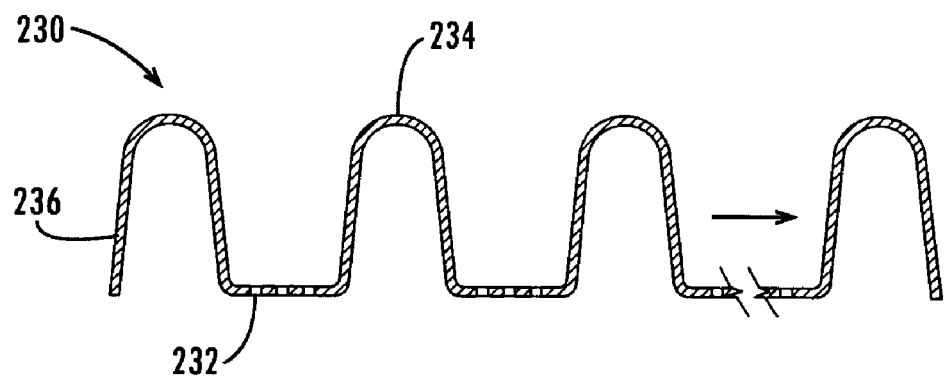

Reference is now made to FIGS. 16A and 16B, which are side views of alternative embodiments of a cooking grate as disclosed herein. The cooking grate of FIG. 16A includes multiple cooking ribs 224 configured to provide a cooking surface. The cooking grate also includes a grate housing 220 configured with channels 226 for receiving and supporting the cooking ribs 224. Between and defining the channels 226, are perforated sections 228 having perforation holes. Additionally, the grate housing 220 includes side walls 222 configured to provide structural integrity and to receive the outermost cooking rib.

FIG. 16B provides a cooking grate 230 having a unitary design. The forming process can include pressing, folding, and bending among others. The cooking grate 230 is formed to create cooking ribs 234 separated by perforated sections 232. The cooking grate 230 can be formed of a planar heat resistant material including but not limited to metallic sheet. Metallic sheet can include titanium, aluminum, mild steel, stainless steel, and tempered steel among others. The cooking grate is formed as a unitary structure that is cost effective to manufacture.

Although the above descriptions and drawings illustrate a generally rectangular geometry, one of ordinary skill in the art will appreciate that the scope and spirit of this disclosure is not limited to a specific geometry. For example, the apparatus and methods herein are directly applicable to grates and grills having circular, elliptical, or a variety of polygonal geometries. Additionally, where metal material is recited above, one of ordinary skill in the art will appreciate that the metal can be any one or a combination of a variety of steels including mild, carbon, or stainless or any other heat resistant metal or combination or alloy thereof.

In the use and operation of an embodiment, as illustrated in FIGS. 1 and 2, a user places the cooking grate 108 on the cooking grate supports 110 located in the cavity 103 of an outdoor cooking grill 100. The heat source 104 is supplied with fuel from the fuel supply line 106 and ignited from an ignition source (not shown). Food is placed on top of the cooking grate 108 and is cooked as a result of the heat generated by the heat source 104 and by the radiant heat from the perforated plate. As the food cooks, food drippings, including, for example, liquefied fat, drip down onto the cooking grate 108. A portion of the food drippings may flow through the perforation holes 125 of the cooking grate and contact the heat source 104. The elevated temperature of the heat source can vaporize the food drippings thereby providing flavor enhancing vapor to the food. However, since the perforations limit the flow of air up through the perforated plate to the area between the ribs, the presence of additional air necessary for combustion of the food drippings is reduced or eliminated thereby reducing or eliminating flare-ups. Additionally, any portion of the food drippings that does not flow through the perforation holes 125 is vaporized by the elevated temperature of the cooking grate.

It should be emphasized that the above-described embodiments of the present disclosure, particularly, any illustrated embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

At least the following is claimed:

1. A cooking grate for improving cooking performance on an outdoor cooking grill, comprising:
    a metallic plate, configured to be placed over a heat source in the outdoor cooking grill, the metallic plate having a plurality of perforation holes; and
    a plurality of cooking surface ribs, configured to support food during cooking and positioned above the metallic plate, the plurality of ribs being further configured as a removable rib assembly, with each of the ribs being configured as an open channel;
    the rib assembly being operatively supported by the metallic plate such that respective open channels of the ribs are positioned between the metallic plate and corresponding cooking surfaces of the ribs;
    an upper surface of the metallic plate has surface channels formed therein as elongate recesses; and
    each of the ribs is oriented to align within a corresponding one of the surface channels.

2. The cooking grate of claim 1, further comprising at least one rib mount, attached to the metallic plate and configured to receive the plurality of cooking surface ribs.

3. The cooking grate of claim 2, wherein the metallic plate and the at least one rib mount are formed from a single metallic sheet.

4. The cooking grate of claim 2, wherein the at least one rib mount further comprises a plurality of notches configured to receive the plurality of cooking surface ribs.

5. The cooking grate of claim 1, further comprising two rib mounts, located proximate to opposing edges of the metallic plate that are substantially perpendicular to the plurality of cooking surface ribs.

6. The cooking grate of claim 1, wherein the metallic plate further comprises a plurality of side walls, substantially positioned at opposite ends of the metallic plate and substantially parallel to the plurality of cooking surface ribs.

7. The cooking grate of claim 6, wherein the metallic plate and the plurality of end walls are formed from a single piece of metallic sheet.

8. The cooking grate of claim 1, wherein the plurality of cooking surface ribs are attached to the at least one rib mount.

9. The cooking grate of claim 1, wherein the metallic plate comprises:
   a plurality of covered sections corresponding to locations of the plurality of cooking surface ribs;
   a plurality of exposed sections corresponding to the locations between the plurality of covered sections; and
   wherein the plurality of perforation holes are positioned to correspond to the plurality of exposed sections.

10. The cooking grate of claim 9, wherein each of the plurality of cooking surface ribs comprises an elongate metallic sheet formed to an inverted substantially U-shaped profile and having a length dimension corresponding to a width of the cooking grate.

11. The cooking grate of claim 1, each of the plurality of cooking surface ribs comprises an elongate metallic sheet formed to an inverted substantially U-shaped profile and having a length dimension corresponding to a width of the cooking grate.

12. The cooking grate of claim 11, wherein the elongated sheet comprises stainless steel.

13. The cooking grate of claim 1, wherein the metallic plate comprises:
   a plurality of covered sections corresponding to locations of the plurality of cooking surface ribs;
   a plurality of exposed sections corresponding to the locations between the plurality of covered sections;
   wherein the plurality of perforation holes are positioned to correspond to the plurality of exposed sections; and
   wherein the surface channels correspond to the locations of the plurality of cooking surface ribs.

* * * * *